(12) United States Patent
Sztuk et al.

(10) Patent No.: US 11,651,518 B2
(45) Date of Patent: May 16, 2023

(54) SYSTEM FOR DETERMINING AN EXPECTED FIELD OF VIEW

(71) Applicant: Meta Platforms Technologies, LLC, Menlo Park, CA (US)

(72) Inventors: Sebastian Sztuk, Menlo Park, CA (US); Kirk Erik Burgess, Newark, CA (US); Lars Ola Axelsson, Brentwood, CA (US); Yi Zhou, San Jose, CA (US)

(73) Assignee: Meta Platforms Technologies, LLC, Menlo, CA (US)

( * ) Notice: Subject to any disclaimer, the term of this patent is extended or adjusted under 35 U.S.C. 154(b) by 0 days.

(21) Appl. No.: 17/338,119

(22) Filed: Jun. 3, 2021

(65) Prior Publication Data

US 2022/0392111 A1 Dec. 8, 2022

(51) Int. Cl.
| | | |
|---|---|---|
| *G06T 7/80* | (2017.01) | |
| *H04N 13/239* | (2018.01) | |
| *H04N 13/246* | (2018.01) | |
| *H04N 5/232* | (2006.01) | |
| *G06F 3/01* | (2006.01) | |
| *G06V 10/25* | (2022.01) | |

(52) U.S. Cl.
CPC ................ *G06T 7/85* (2017.01); *G06F 3/013* (2013.01); *G06V 10/25* (2022.01); *H04N 5/23216* (2013.01); *H04N 5/23218* (2018.08); *H04N 13/239* (2018.05); *H04N 13/246* (2018.05)

(58) Field of Classification Search
CPC ....... G06T 7/85; H04N 13/246; H04N 13/239
USPC .......................................................... 348/47
See application file for complete search history.

(56) References Cited

U.S. PATENT DOCUMENTS

| | | |
|---|---|---|
| 9,279,983 B1 * | 3/2016 | Davis .................. G06F 3/03547 |
| 10,091,399 B2 | 10/2018 | Yakay et al. |
| 10,114,465 B2 | 10/2018 | Wan et al. |
| 10,176,554 B2 | 1/2019 | Gossow |
| 10,567,641 B1 | 2/2020 | Rueckner |
| 2015/0181123 A1 | 6/2015 | Pacurariu et al. |
| 2018/0246331 A1 * | 8/2018 | Cheng ................. H04N 13/383 |
| 2018/0376054 A1 * | 12/2018 | Patel ..................... H04N 5/232 |
| 2019/0103026 A1 * | 4/2019 | Liu ........................ G06V 10/25 |
| 2019/0197327 A1 * | 6/2019 | Mangla .................. G06T 11/00 |
| 2020/0065612 A1 * | 2/2020 | Xu ........................... G06N 3/02 |
| 2020/0302041 A1 * | 9/2020 | Mohammad ......... G06V 40/172 |

OTHER PUBLICATIONS

Lu et al., "3D Gaze Estimation for Head-Mounted Eye Tracking System with Auto-Calibration Method," IEEE Access, vol. 8, published Jun. 3, 2020, pp. 104207-104215.
Liu M., et al., "3D Gaze Estimation for Head-Mounted Eye Tracking System with Auto-Calibration Method," vol. 8, Jun. 2020, pp. 104207-104215.
International Search Report and Written Opinion for International Application No. PCT/US2022/029922, dated Sep. 5, 2022, 14 pages.

* cited by examiner

*Primary Examiner* — Amir Shahnami
(74) *Attorney, Agent, or Firm* — Lee & Hayes, P.C.

(57) ABSTRACT

An image capture system is configured to align a field of view of the image capture component with a field of view of a user of the system. In some cases, the image capture system may adjust the field of view of the image data based at least in part on orientation and position data associated with the capture device.

20 Claims, 12 Drawing Sheets

SYSTEM FOR DETERMINING AN EXPECTED FIELD OF VIEW

BACKGROUND

Today, wearable electronic devices are becoming more and more commonplace. Many of these wearable electronic devices are equipped with one or more image capture devices that may be used to capture images and videos of the user's environment. However, in some cases, the wearable electronic devices do not provide real time feedback to the user. In these cases, the image and video data captured by the wearable electronic device may not necessarily correspond to the region of interest or field of view of the user as intended.

Figure 1:
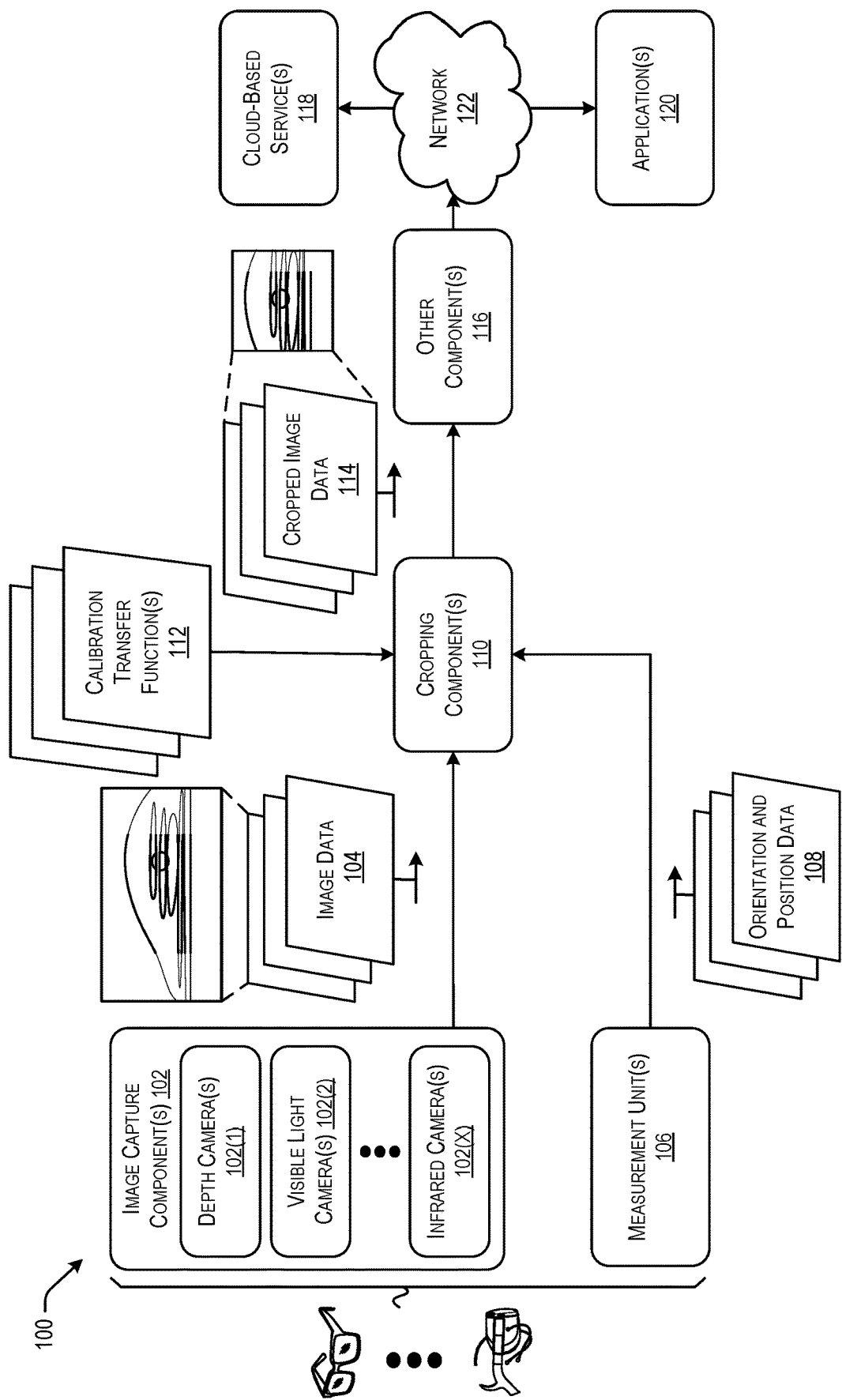
FIG. 1 is a block diagram of an example image capture system, in accordance with one or more examples.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

An electronic system is described herein. The electronic system may comprise a wearable component or device that is configured to capture image data associated with an environment surrounding a user. In some cases, the electronic system may comprise one or more image devices that include independent or local shutter controls. For example, the electronic device may be glasses or other head-mounted devices that are equipped with an image device proximate to each temple and/or the bridge.

In some implementations, the electronic system, described herein, may be configured to estimate a field of view or region of interest of the user (e.g., an area of the environment the user is looking at or otherwise viewing) based at least in part on orientation data received from an orientation and/or motion sensor, such as an inertial measurement unit (IMU), accelerometer, magnetometer, gyroscope, or other device for capturing orientation and/or motion data.

In some examples, the electronic system may also be configured to generate shutter delays for one or more of the image devices based at least in part on the structure of the electronic system, the orientation and motion data associated with the user (e.g., head motion), and/or detected motion of an object or agent within the environment. For instance, the electronic device may determine a shutter delay to synchronize, within the time domain, image data of multiple image capture devices based on an analysis and/or comparison of prior proceeding frames generated by each of the image devices.

In some cases, the wearable electronic devices may include audio and/or voice control via natural langue processing systems. These wearable voice-controlled devices may not provide real-time visual feedback to a user or may be usable without real-time visual feedback enabled. For example, a wearable head-mounted device or glasses may be equipped with one or more image capture devices to capture and generate corresponding image data of an environment surrounding the user. In some examples, the wearable device may not include displays to display the captured images, or in some instances the wearable device may include displays but may be configured to operate without presenting image data captured by the image capture devices. In general, the user of the wearable electronic device intends to capture image data associated with the user's current region of interest or field of view. However, without real-time visual feedback of the image data generated by the image devices, the user may be unable to manually align the user's field of view with the field of view of the image capture devices. In other words, the image data captured using conventional devices may not align with the user's field of view and, in some cases, may not even include an intended region or object of interest.

As an illustrative example, the image capture devices may be affixed to a position along the frame of the wearable electronic devices (e.g., along the frame of the glasses or head-mounted device). In this manner, as the user wears the glasses on their head, when the user moves their head upward and/or downward, the glasses as well as the field of view associated with the image devices affixed thereto move upward and downward correspondingly. However, the eyes of the user may move independently from the head of the user, thereby resulting in a partial discontinuity between the field of view of the user and the field of view of the image capture devices when the user looks upward and/or downward. For instance, as the user tilts their head upwards in a vertical manner, the user's eyes may also adjust upward causing the field of view of the user to tilt upward to a greater degree than the upward tilt of the user's head and as such the field of view of the image capture device. Similarly, when the user tilts their head downwards in a vertical manner, the user's eyes may also adjust downward causing the field of view of the user to tilt downward to a greater degree than the downward tilt of the user's head and the field of view of the image capture device.

In some examples, discussed herein, the image capture devices may include an extended vertical field of view and the electronic device may be based at least in part on orientation and movement data received from an IMU on the wearable electronic device, adjust the vertical cropping of the image data. For instance, if the IMU data indicates a downward tilt of the head of the user, the electronic device may crop the image data based on a field of view that is a predetermined vertical distance lower than the field of view indicated by the IMU data. In some cases, the predetermined vertical distance may be variable based on an extent to which the IMU data indicates the user tilted their heads upwards or downwards. For instances, the greater the upward or downward tilt of the head, the greater the predetermined vertical distance may vary from the position indicated by the IMU data. In some specific examples, the values of the predetermined vertical distance may be trained or learned using one or more machine learned models or networks. In other examples, the field of view of the eyes of the user may be determined using a gaze detection system on the wearable electronic device and the additional adjustment for the tilt of the eyes may be determined using the detected field of view or gaze of the eyes together with the IMU data.

In another example, the electronic device may be configured to generate a stereo captured image data. However, the image devices may not be aligned vertically along the head of the user during use even when the image devices are factory aligned on the frame of the wearable electronic device. For instance, often times a user may have two ears with different heights causing the wearable glasses or head-mounted device to sit a slight angle with respect to each other (e.g., one or more of the image devices may be vertically misaligned with the others). In some cases, the vertical misalignment may be a height differential, which may be adjusted by detecting objects within the image data of each image capture device and adjusting a crop with respect to one or both image capture devices to align the object.

In other cases, the misalignment may be a tilt upward or downward with respect to a first image capture device in relation to a second image capture device (e.g., one image capture device is tilted more upward or downward than the other). In this example, the issues may be exacerbated when the first and second image capture device are using independently controlled rolling shutters and/or the object of interest is moving. In this example, the electronic device may determine a direction of horizontal travel of the object based on a predetermined prior number of frames (e.g., 2, 5, 10, etc.) and causing, based at least in part on a known or determined skew between the image capture devices, one of the image capture devices to delay capture slightly (such as by one frame) when compared with the other image capture device. In this manner, the image capture data may more accurately or closely align within the time domain prior to cropping. In some cases, the skew between the image capture devices may be determined as the image data is captured based on an analysis of objects within the predetermined prior number of frames.

In another example, the wearable electronic device may also be configured to apply a horizontal crop to the image data to again align the field of view of the image data with the field of view of the eyes of the user. In some cases, the horizontal crop may be performed with respect to the sensor, a processor of the wearable electronic device, or on a remote system. In some case, the wearable electronic device may detect motion of an object within the image data and/or the head of the user and adjust a crop associated with the image data generated by one or more of the image capture devices to align based on the position of the object with respect to the cropped image data. In some cases, the wearable electronic device may also apply a rotation correction to the image data based on the IMU data. For example, the user may twist or turn their head with respect to the field of view. The electronic device may then adjust the crop the image data to correct for the rotation as well as to apply various stabilization systems on one or more of the image devices associated with the head twisting.

In some examples, the image data may be used to correct for tilting, twisting and/or rotation of the head of the user. For example, the electronic device may detect a horizon within the image data and adjust a tilt or orientation of the image data, such that the horizon falls along a substantially horizontal plane.

FIG. 1 is a block diagram of an example image capture system 100, in accordance with one or more examples. As illustrated the image capture system 100 may comprise one or more image capture devices 102 to generate image data 104 representative of a physical environment. For instance, the image capture system 100 may be equipped with depth cameras 102(1) to generate depth data, visible light cameras 102(2) to generate red-green-blue image data, infrared cameras 102(X), image devices usable to perform simultaneous location and mapping techniques, and the like. In some cases, each image capture device 102 may comprise multiple image devices, such as a stereo pair of image devices, and the like. In various implementations, the field of view or resolution associated with each image capture device 102 may be extended to allow for cropping and/or alignment between the field of view of the user and the center of, for instance, a particular frame.

In the illustrated example, the image capture system 100 also includes one or more measurement units 106 to generate orientation and/or position data 108 associated with an electronic device including the image capture system 100. For example, the measurement units 106 may comprise one or more IMUS, accelerometers, gyroscopes, magnetometers, and/or a combination thereof. In some cases, the measurement units 106 may be associated with a particular image capture device 102. For example, the measurement units 106 may be aligned with or positioned within proximity to a particular image capture device 102, such that the orientation and/or position data 108 is localized with respect to the image capture device 102.

In the current example, a cropping component 110 may receive the image data 104 and/or the orientation and/or position data 108 from the image capture devices 102 and the measurement units 106, respectively. The cropping component 110 may be configured to parse or otherwise analyze the image data (such as the preceding frames with respect to a current frame) and to identify a target object or region within the image data 104. The cropping component 110 may then adjust a position of a field of view or region of view associated with the image data 104 to include or otherwise be centered about or aligned with the target object or region. In some cases, the cropping component 110 may utilize one or more machine learned models or networks to identify the target object or region within the preceding frames of the image data 104. For instance, the cropping component 110 may input a predetermined number of preceding images into the machine learned model or network and receive as an output the target object or region. In this instance, the cropping component 110 may then identify the target object and region within the current frame and crop the image data 104 accordingly. For example, a machine learned model or neural network may be a biologically inspired technique which passes input data (e.g., the frames or other image/sensor data) through a series of connected layers to produce an output or learned inference. Each layer in a neural network can also comprise another neural network or can comprise any number of layers (whether convolutional or not). As can be understood in the context of this disclosure, a neural network can utilize machine learning, which can refer to a broad class of such techniques in which an output is generated based on learned parameters.

As an illustrative example, one or more neural network(s) may generate any number of learned inferences or heads from the image data 104. In some cases, the neural network may be a trained network architecture that is end-to-end. Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like. In some cases, the system may also apply Gaussian blurs, Bayes Functions, color analyzing or processing techniques and/or a combination thereof.

In some cases, the image capture system 100 and/or the cropping component 110 may also be configured to apply cropping (such as a horizontal crop) based on a twist or turn of the head as well as movement of the target object. In these cases, the cropping system may apply the crop based on the orientation and/or position data 108 indicating a rotation or translation of the head of the user. In one specific example, the cropping component 110 may detect a horizon within the image data 104 and adjust a tilt or orientation of the image data 104 via a tilted crop, such that the horizon falls along a substantially horizontal plane.

In some implementations, the cropping component 110 may receive calibrated transfer functions 112 in addition to the image data 104 and/or the orientation and/or position data 108. For instance, as discussed above, as a user tilts their head upward and downward, the field of view experience an extended upward and/or downward tilt (e.g., the field of view tilts more than the head). In these instances, the eyes of the user may provide the additional tilt to the field of view. However, the change in field of view with respect to the eyes of the user may not be represented in the orientation and/or position data 108, as the eyes move independently from the head. In these instances, the cropping component 110 may apply one or more calibrated transfer functions 112 to adjust the vertical crop of the image data 104. For example, the calibrated transfer functions 112 may represent an expected eye tilt based on corresponding actual head tilt determined based at least in part on the orientation and/or position data 108. In some cases, the calibrated transfer functions 112 may be learned or trained using one or more machine learned models.

In one specific example, the electronic device may be equipped with one or more gaze determining systems and/or sensors. For example, the electronic device may include the image capture system 100 directed generally at the field of view of the user as well as a gaze detection system directed at the eyes of the user. In this example, the cropping component 110 may receive gaze data from the gaze detection system in addition to or in lieu of the calibrated transfer function 112 in order to adjust the vertical crop with respect to the image data 104 based at least in part on the orientation and/or position data 108.

Once the cropped image data 114 is output by the cropping component 110, the cropped image data 114 may be utilized by other components 116 of the electronic device. The cropped image data 114 may also be transferred or sent to other cloud-based services 118 and/or companion applications 120 hosted by other devices associated with the user or wearer via one or more networks 122. In these examples, by performing the cropping onboard the electronic device by the cropping component 110, the electronic device is able to transfer less data over the network 122, thereby reducing bandwidth and network resource consumption. For example, as discussed above, the image capture device 102 may capture a wider or larger field of view than necessary and conventional systems may transfer or stream the larger raw image data to a remote system for processing. However, the system discussed herein crops or otherwise reduces the image data 104 to the desired size and content prior to transmitting or streaming over the network 122, thereby significantly reducing the network resource consumption and costs associated therewith.

Figure 2:
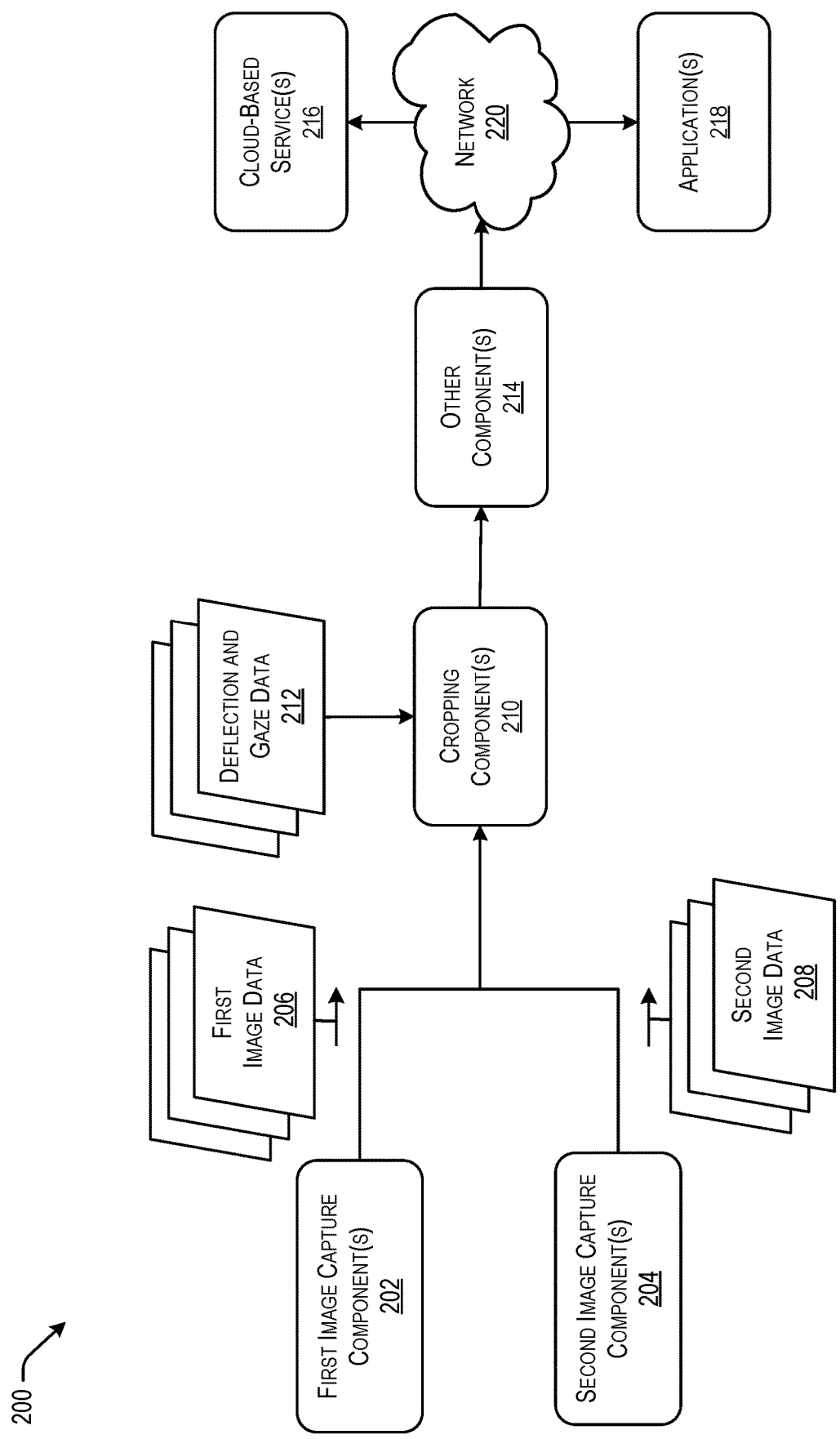
FIG. 2 is block diagram of another example of the image capture system, in accordance with one or more examples.

FIG. 2 is block diagram of another example of the image capture system 200, in accordance with one or more examples. As discussed above, the wearable electronic device may be equipped with a stereo image capture system 200 including at least a first image capture component 202 and a second image capture component 204 configured to generate a stereo captured image data. However, the first image capture component 202 and the second image capture component 204 may become misaligned vertically and/or horizontally during use even when factory aligned. For example, often, a user may have two ears with slightly different heights causing the wearable electronic device (e.g., glasses, head-mounted device, and the like) to sit a slight angle with respect to each other and one or more axes (e.g., a horizonal or vertical plane) associated with the frame of the wearable electronic device.

In the current example, the first image capture component 202 may generate first image data 206 associated with a physical environment surrounding the system 200 and the second image capture component 204 may generate second image data 208 associated with the physical environment. As discussed above, the system 200 may include a cropping component 210 that receives the first image data 206 and the second image data 208. The cropping component 210 may be configured to parse or otherwise analyze the first image data 206 and the second image data 208 (such as the preceding frames with respect to current frames) and to identify a target object or region within the first image data 206 and the second image data 208. The cropping component 210 may then adjust (e.g., move horizontally, move vertical, or tilt) a position of a field of view or region of view associated with the first image data 206 and the second image data 208 to include or otherwise be centered about or aligned with the target object or region and each other. Again, the cropping component 210 may utilize one or more machine learned models or networks to identify the target object or region or otherwise align the first image data 206 and the second image data 208.

In this example, the user may also perform an initialization or set up process such that the image capture system 200 may determine one or more deflection data and/or gaze data. For example, an application 218 associated with the system 200 either hosted by the wearable electronic device and/or an associated portable electronic device (such as a smartphone, tablet, personal computer, or the like) may cause the user or wearer to perform a setup or initialization. For example, the user may be instructed to stand in front of a mirror with their head positioned at various angles (such as looking straight, up, down, left, right, at the user's hands, at a horizon, at an object a predetermined distance away, for example, 1 meter, 2 meters, 5 meters, 10 meters, and the like). The first image capture component 202 and the second image capture component 204 may generate initialization image data, such as the first image data 206 and the second image data 208, during the initialization process. The cropping components 210 and/or another system, such as the application 218 or a cloud-based service 216 via a network 220 or to other components 214 of the wearable electronic device, may determine deflection data and/or gaze data 212 associated with the individual characters and facial features of the user. The deflection data and/or gaze data 212 may then be stored, such that the cropping component 210 may crop the first image data 206 and the second image data 208 using the deflection data and/or gaze data 212 to generate output image data representing the field of view of the user. The output image data may then be used on the system 200, sent, transmitted, or otherwise streamed, such as via a wireless network interface, to other devices for further processing.

Figure 3:
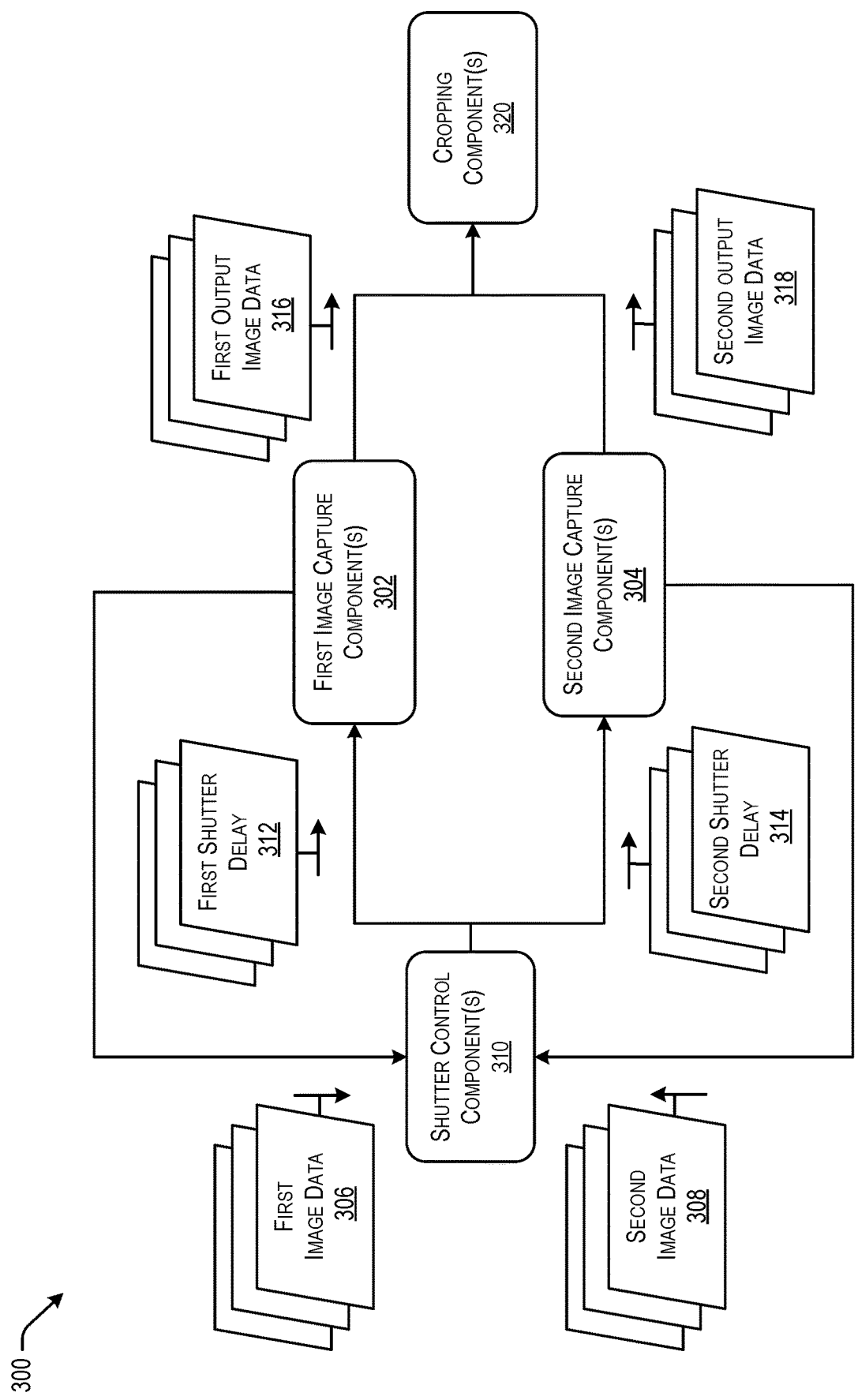
FIG. 3 is block diagram of another example of the image capture system, in accordance with one or more examples.

FIG. 3 is block diagram of another example of the image capture system 300, in accordance with one or more examples. In this example, the wearable electronic device, again, may be equipped with a stereo image capture system 300 including at least a first image capture component 302 and a second image capture component 304 configured to generate a stereo captured image data. In some cases, each of the first image capture component 302 and the second image capture component 304 have an independent shutter which may result in the image data 306 and 308 being misaligned in the time domain. In other words, the shutter of the first image capture component 302 may be closed when the shutter of the second image capture component 304 is open.

In these examples, a shutter control component 310 may receive the first image data 306 (such as a first set of proceeding frames) and the second image data 308 (such as a second set of proceeding frames). The shutter control component 310 may determine a target object or region within the first set of frames and the second set of frames and a distance between the target and the user. The shutter control component 310 may also determine if the target (such as a target object) is moving and/or the head of the user is moving. The shutter control component 310 may then determine a first shutter delay 312 associated with the first image capture component 302 or a second shutter delay 314 associated with the second image capture component 304 based at least in part on the distance, a direction of travel of the head of the user and/or the target, and the skew of each of the first image capture component 302 and the second image capture component 304. By delaying or pausing the shutter of one or both of the first image capture component 302 and the second image capture component 304, the system 300 may align subsequent frames, such as the first output image data 316 and the second output image data 318 within the time domain. In this manner, the first output image data 316 from the first image capture component 302 and the second output image data 318 from the second image capture component 304 may be aligned within the time domain, thereby assisting the cropping component 320 in further cropping or framing the image data prior to storage, streaming, and/or transmission to other components and/or devices. For example, the system 300 may store the first output image data 316 and/or the second output image data 318 locally and then send, transmit, and/or stream the first output image data 316 and/or the second output image data 318 to another remote device.

FIGS. 4-8 are flow diagrams illustrating example processes associated with adaptively cropping image data, in accordance with one or more examples. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the FIGS. 1-3. While FIGS. 4-8 are show in separate flow diagrams, the operations shown in FIGS. 4-8 may be combined and used together. For instance, the deflection data described with reference to FIG. 5 may be used in combination with the gaze data described with reference to FIG. 6, the target described with reference to FIG. 7, and/or the shutter delay described with reference to FIGS. 7 and 8 in order to determine and crop, or otherwise adjust, the image data.

Figure 4:
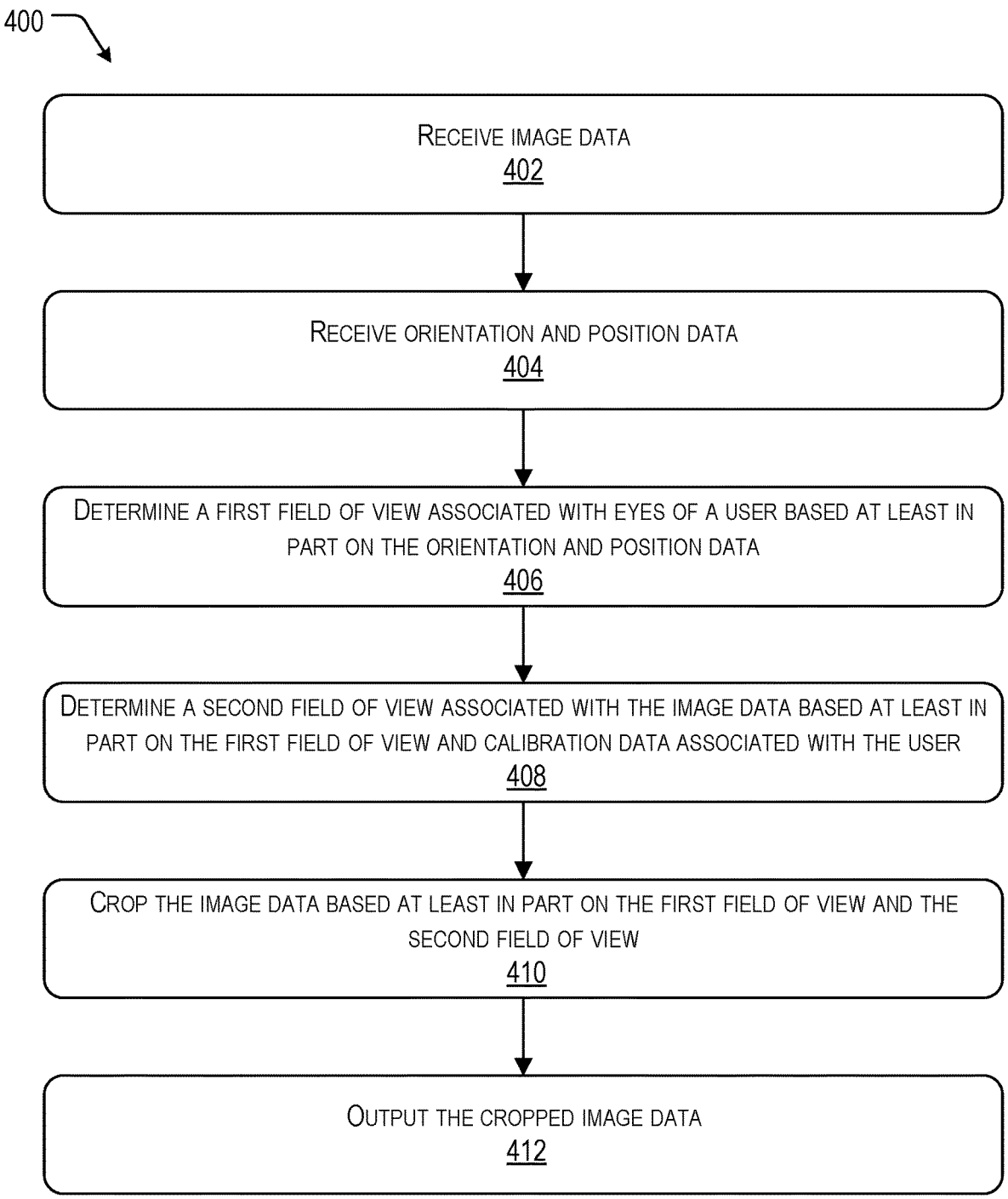
FIG. 4 is a flowchart of an example process for adaptively cropping image data, in accordance with one or more examples.

FIG. 4 is a flowchart of an example process 400 for adaptively cropping image data, in accordance with one or more examples. As discussed above, in some cases, an image capture system associated with a wearable electronic device. The system may be configured with image capture components that have a wider field of view or resolution than the system is configured to output. The system is then able to adaptively crop or frame the image data to substantially align the output image data with an intended field of view of the user.

At 402, the system may receive image data from one or more image capture devices. For example, the system may receive a user input (such as a natural language input or tactile command) to capture image data of an environment surrounding the user. As discussed above, the system may be incorporated into a wearable electronic device, such as a pair of glasses or other head-mounted device. The user input may be an intent of the user to capture a region or object that the user is current viewing. However, in some cases, the system may not include a visual feedback that the user may use to align and focus the image capture device. Accordingly, the image data may not be centered or aligned with the field of view associated with the user.

At 404, the system may receive orientation and/or position data associated with the wearable electronic device and, thereby, associated with the head of the user. For example, the system may include one or more measurement units (e.g., an IMU, accelerometers, gyroscopes, and the like) to capture data associated with motion, acceleration, rotation, translations, tilts, and the like of the of the system. In some cases, the system may include one or more measurement units positioned in physical proximity to each of the image capture component to provide local orientation and/or position data for the corresponding image capture component.

At 406, the system may determine a first field of view associated with eyes of a user based at least in part on the orientation and position data. For example, the system may estimate a field of view of the user based on the current position (e.g., angle, tilt, and the like) of the head of the user inferred from the orientation and position data.

At 408, the system may determine a second field of view associated with the image data based at least in part on the first field of view and calibration data associated with the user. For instance, the user may have performed an initialization process with respect to the wearable electronic device and the image capture system. As an illustrative example, the user may have worn the electronic device while viewing a mirror. In this example, the system may instruct the user to transition between multiple head positions while the image capture system is engaged. The system may then analyze the captured image data to determine the calibration data. For instance, the system may determine a ratio of a change in field of view of the eyes of the user at various head positions (e.g., various head tilts). In other examples, the system may store factory determined calibration data, such that the system adjusts the second field of view based on an average user.

At 410, the system may crop (or adjust a framing) of the image data based at least in part on the first field of view and the second field of view. For instance, as the image data has a larger field of view or resolution than the output image data, the system may adjust a cropping region to match the field of view of the eyes of the user. It should be understood that the cropped region may be adjusted vertically and/or horizontally as well as rotated.

At 412, the system may output the cropped image data. For example, the system may output the cropped image data to an application on a companion or paired device, other components of the wearable electronic device, and/or a cloud-based service. It should be understood that by performing the cropping or framing onboard the electronic device, the system is able to transfer less data over networks, thereby reducing bandwidth and network resource consumption associated with the wearable electronic device when compared with conventional systems.

Figure 5:
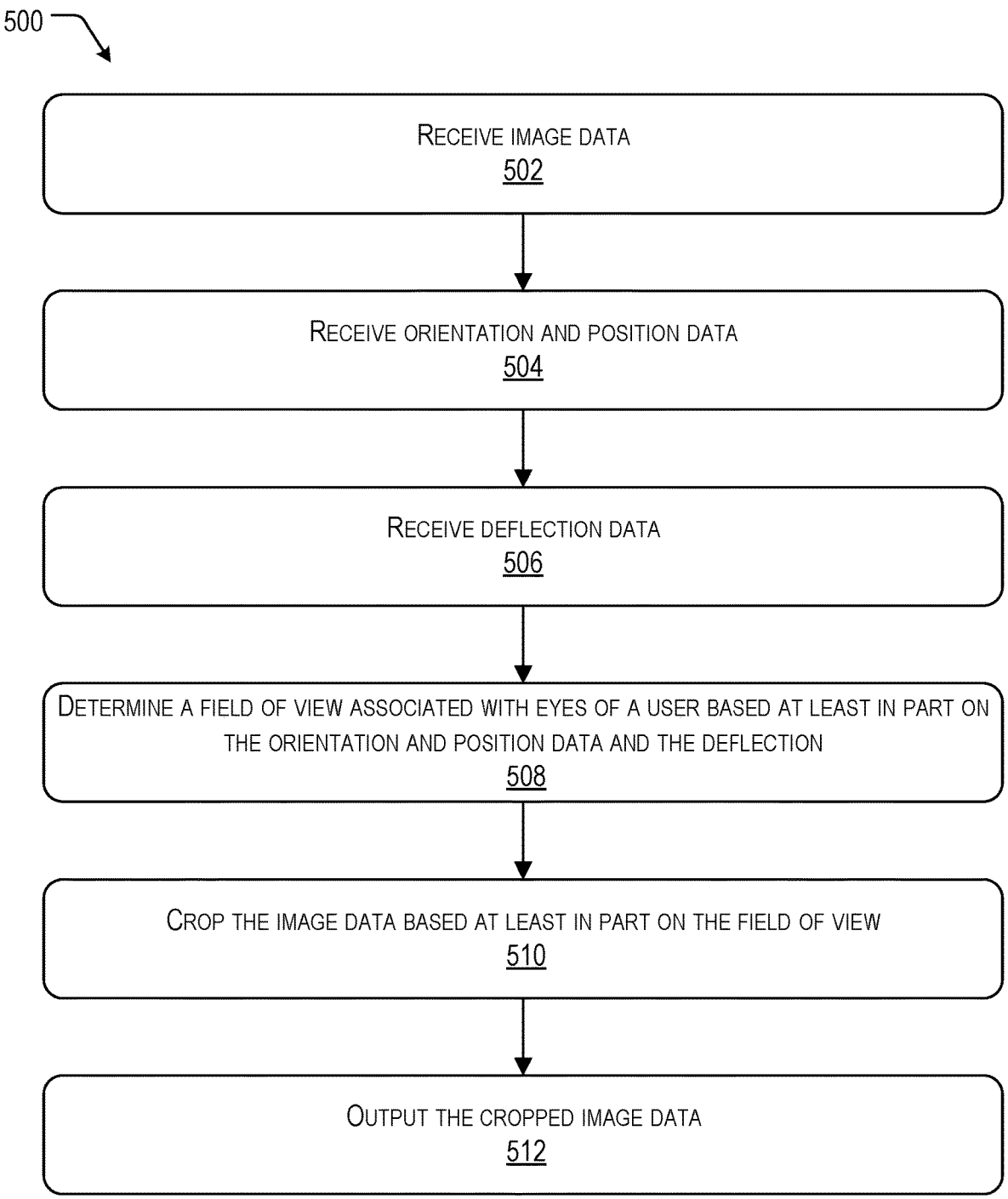
FIG. 5 is a flowchart of another example process for adaptively cropping image data, in accordance with one or more examples.

FIG. 5 is a flowchart of another example process 500 for adaptively cropping image data, in accordance with one or more examples. Again, as discussed above, an image capture system associated with a wearable electronic device may be configured with image capture components that have a wider field of view or resolution than the system is configured to output. The system is then able to adaptively crop or frame the image data to substantially align the output image data with an intended field of view of the user.

At 502, the system may receive image data from one or more image capture devices. For example, the system may receive a user input (such as a natural language input or tactile command) to capture image data of an environment surrounding the user. As discussed above, the system may be incorporated into a wearable electronic device, such as a pair of glasses or other head mounted devices. The user input may be an intent of the user to capture a region or object that the user is current viewing. However, in some cases, the system may not include a visual feedback that the user may use to align and focus the image capture device. Accordingly, the image data may not be centered or aligned with the field of view associated with the user.

At 504, the system may receive orientation and/or position data associated with the wearable electronic device and, thereby, associated with the head of the user. For example, the system may include one or more measurement units (e.g., an IMU, accelerometers, gyroscopes, and the like) to capture data associated with motion, acceleration, rotation, translations, tilts, and the like of the of the system. In some cases, the system may include one or more measurement units positioned in physical proximity to each of the image capture component to provide local orientation and/or position data for the corresponding image capture component.

At 506, the system may receive deflection data associated with the wearable electronic device. For example, ears of a user may not be perfectly aligned in a horizontal plane. Therefore, the wearable electronic device may have some deflection or deformation that causes factory aligned image capture components to become unaligned or misaligned. In this example, as discussed above, the system may cause the user to perform an initialization process in which the deflection data may be determined with respect to the individual wearer or user. The deflection data may then be accessed by the system during normal operations.

At 508, the system may determine a field of view associated with eyes of a user based at least in part on the orientation and position data and the deflection data. For instance, the system may apply adjust a field of view of the image capture components to compensate for movements and position of the head of the user as well as the deflection or deformation caused by facial features of the user. As an illustrative example, the system may rotate the field of view to compensate for the wearable electronic device resting at an angle or tilt caused by the left ear of the user being high than the right ear of the user.

At 510, the system may crop (or adjust a framing) of the image data based at least in part on the field of view. For instance, as discussed above, as the image data has a larger field of view or resolution than the output image data, the system may adjust a cropping region to match the field of view of the eyes of the user and to correct for any orientation or alignment issues caused by a deflection or deformation of the wearable electronic device with respect of the individual user. It should be understood that the cropped region may be adjusted vertically and/or horizontally as well as rotated. In some other examples, the crop may be selected based on user preferences, such as prior edits, typical crops, user input settings and the like.

At 512, the system may output the cropped image data. For example, the system may output the cropped image data to an application on a companion or paired device, other components of the wearable electronic device, and/or a cloud-based service. It should be understood that by performing the cropping or framing onboard the electronic device, the system is able to transfer less data over networks, thereby reducing bandwidth and network resource consumption associated with the wearable electronic device when compared with conventional systems.

Figure 6:
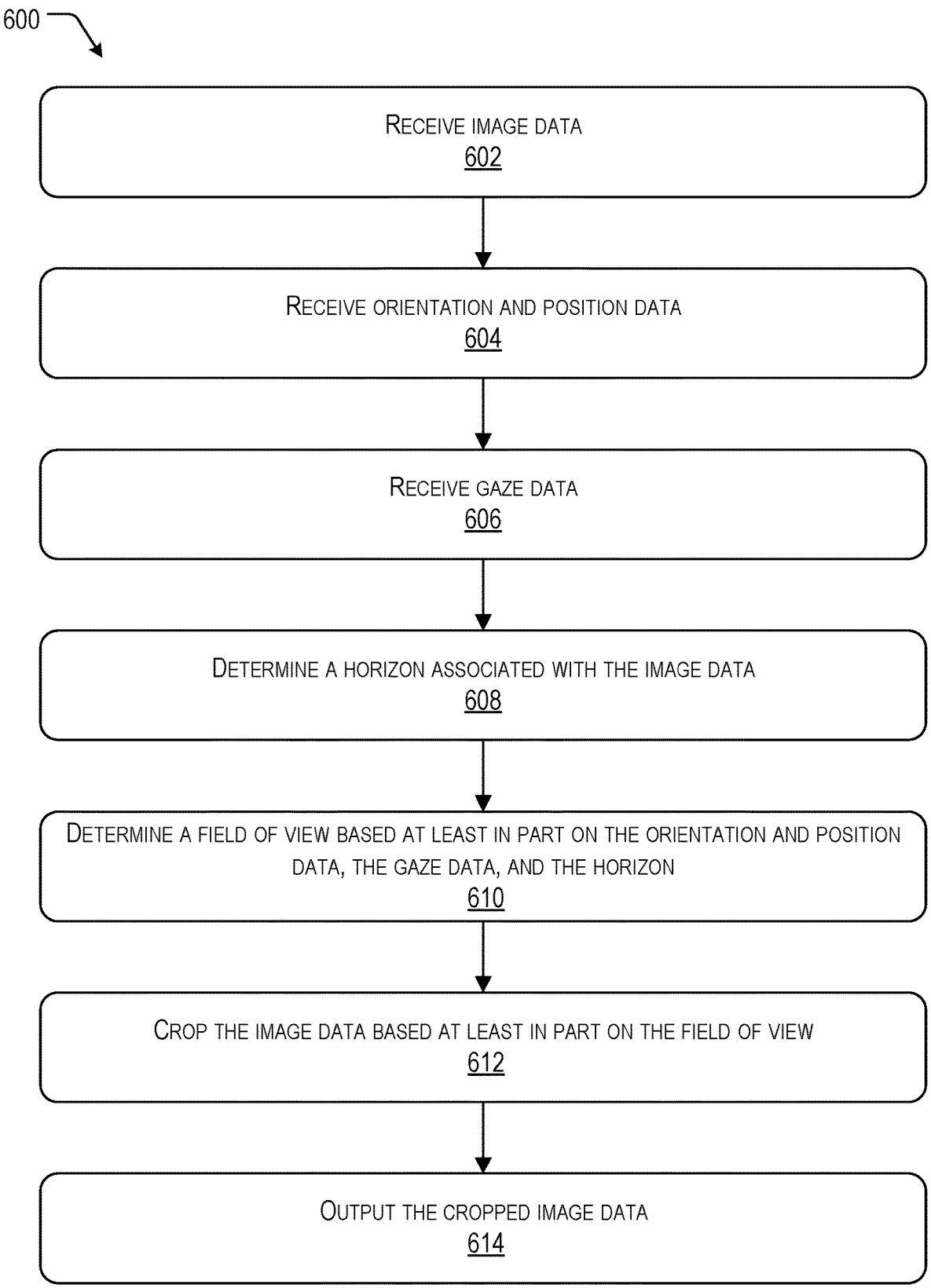
FIG. 6 is a flowchart of another example process for adaptively cropping image data, in accordance with one or more examples.

FIG. 6 is a flowchart of another example process 600 for adaptively cropping image data, in accordance with one or more examples. Again, as discussed above, an image capture system associated with a wearable electronic device may be configured with image capture components that have a wider field of view or resolution than the system is configured to output. The system is then able to adaptively crop or frame the image data to substantially align the output image data with an intended field of view of the user.

At 602, the system may receive image data from one or more image capture devices. For example, the system may receive a user input (such as a natural language input or tactile command) to capture image data of an environment surrounding the user. As discussed above, the system may be incorporated into a wearable electronic device, such as a pair of glasses or head mounted device. The user input may be an intent of the user to capture a region or object that the user is current viewing. However, in some cases, the system may not include a visual feedback that the user may use to align and focus the image capture device. Accordingly, the image data may not be centered or aligned with the field of view associated with the user.

At 604, the system may receive orientation and/or position data associated with the wearable electronic device and, thereby, associated with the head of the user. For example, the system may include one or more measurement units (e.g., an IMU, accelerometers, gyroscopes, and the like) to capture data associated with motion, acceleration, rotation, translations, tilts, and the like of the of the system. In some cases, the system may include one or more measurement units positioned in physical proximity to each of the image capture component to provide local orientation and/or position data for the corresponding image capture component.

At 606, the system may receive gaze data associated with eyes of the user of the wearable electronic device. For example, the system may include one or more image capture components (such as an infrared camera), sensors, illuminators (such as an infrared illuminator), and/or the like. In some cases, the system may determine a gaze or direction of gaze of the user based on the data generated by the one or more image capture components, sensors, and/or illuminators.

At 608, the system may determine a horizon associated with the image data. For example, the system may determine a substantially horizontal plane within the image data based on a position of the horizon. In some cases, as the user may hold their head at an angle compared with the scene, the system may use the horizon to vertically align the image data as the user would expect with respect to a photograph.

At 610, the system may determine a field of view associated with eyes of a user based at least in part on the orientation and position data, the gaze data, and the horizon. For instance, the system may apply adjust a field of view of the image capture components to compensate for movements and position of the head of the user (as indicated by the orientation and position data) as well as the movements of the eyes of the user (as indicated by the gaze data).

At 612, the system may crop (or adjust a framing) of the image data based at least in part on the field of view. For instance, as discussed above, as the image data has a larger field of view or resolution than the output image data, the system may adjust a cropping region to match the field of view of the eyes of the user and to correct for any orientation or alignment issues caused by a deflection or deformation of the wearable electronic device with respect of the individual user. It should be understood that the cropped region may be adjusted vertically and/or horizontally as well as rotated.

At 614, the system may output the cropped image data. For example, the system may output the cropped image data to an application on a companion or paired device, other components of the wearable electronic device, and/or a cloud-based service. It should be understood that by performing the cropping or framing onboard the electronic device, the system is able to transfer less data over networks, thereby reducing bandwidth and network resource consumption associated with the wearable electronic device when compared with conventional systems.

Figure 7:
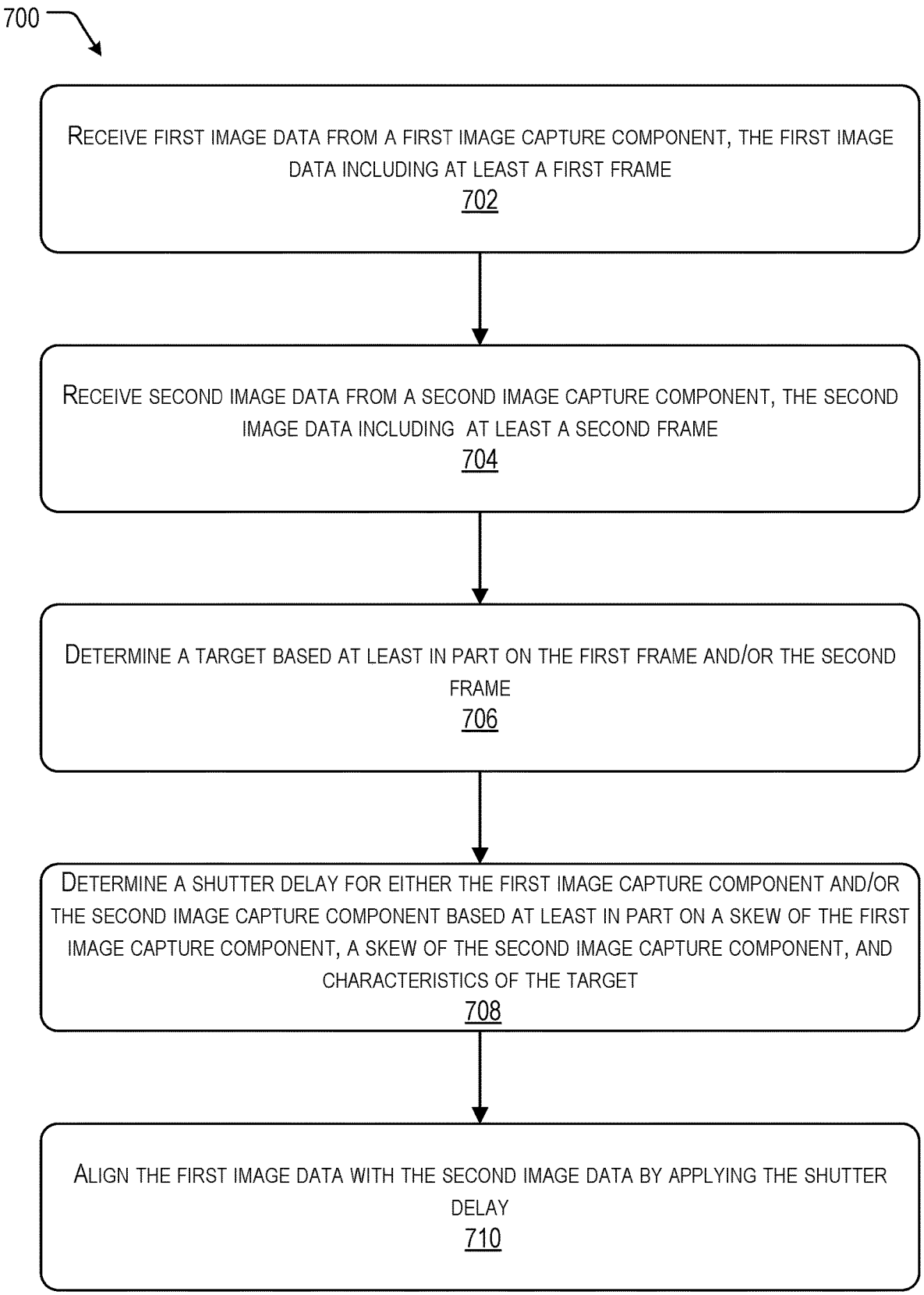
FIG. 7 is a flowchart of an example process for aligning stereo image data, in accordance with one or more examples.

FIG. 7 is a flowchart of an example process 700 for aligning stereo image data, in accordance with one or more examples. For instance, in some implementations, the system may include two or more image capture devices that are configured to generate the stereo image data, for instance, to assist with determining depth and other data related to the physical environment. In some cases, the image capture devices may have independently controlled shutters and skews, which may cause issues when the image data of each respective image capture component is not aligned in the time domain and the user and/or a target of the image is moving. For instance, in these cases, one or more of the frames of the image data may not align in the time domain and the object or region of interest may not be aligned.

At 702, the system may receive first image data from a first image capture component, the first image data including at least a first frame and, at 704, the system may receive second image data from a second image capture component, the second image data including at least a second frame. As discussed above, the scene associated with the first image data and the second image data may include a target region or object that is moving with respect to the user (e.g., either the object is moving and/or the user is moving) and each of the image capture components may include an independently controlled shutter.

At 706, the system may determine a target based at least in part on the first frame and/or the second frame. For example, the system may analyze the first frame and/or second frame to identify a target such as an object. In some specific examples, the system may utilize one or more machine learned models or networks to segment and classify the first image data and the second image data and, thereby, identify or determine the target. In some cases, the system may determine, such as via the machine learned models or networks, characteristics (e.g., direction of travel, acceleration, velocity, and the like) of the target with respect to the user.

At 708, the system may determine a shutter delay for either the first image capture component or the second image capture component based at least in part on a skew of the first image capture component, a skew of the second image capture component, and one or more characteristics of the target and, at 710, the system may align the first image data and the second image data by applying the shutter delay. For example, the system may determine a direction of travel of the target with respect to the user and a velocity. Then based on the direction of travel and velocity as well as the skew data for both image capture devices, determine a shutter delay (such as 1 frame, 2 frames, 3 frames, or the like) to apply to one or both of the image capture components in order to align the first image data and the second image data in the time domain.

Figure 8:
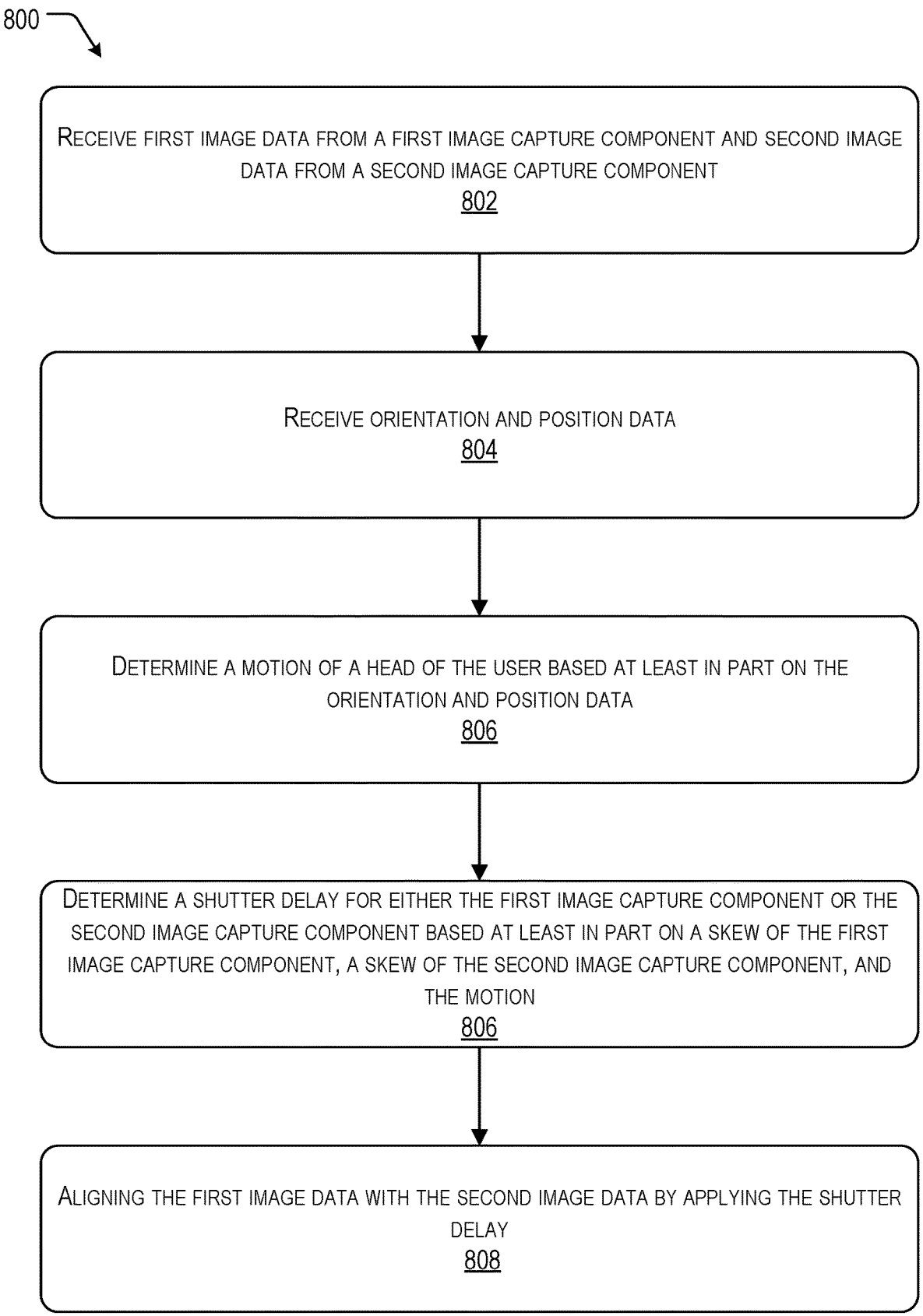
FIG. 8 is a flowchart of another example process for aligning stereo image data, in accordance with one or more examples.

FIG. 8 is a flowchart of another example process 800 for aligning stereo image data, in accordance with one or more examples. For instance, in some implementations, the system may include two or more image capture devices that are configured to generate the stereo image data, for instance, to assist with determining depth and other data related to the physical environment. In some cases, the image capture devices may have independently controlled shutters and skews, which may cause issues when the image data of each respective image capture component is not aligned in the time domain and the user and/or a target of the image is moving. For instance, in these cases, one or more of the frames of the image data may not align in the time domain and the object or region of interest may not be aligned.

At 802, the system may receive first image data from a first image capture component and second image data from a second image capture component. In some cases, the system may receive a first plurality of frames from the first image capture component and a second plurality of frames from the second image capture component. As discussed above, the scene associated with the first image data and the second image data may include a target region or object that is moving with respect to the user (e.g., either the object is moving and/or the user is moving).

At 804, the system may receive orientation and/or position data associated with the wearable electronic device and, thereby, associated with the head of the user. For example, the system may include one or more measurement units (e.g., an IMU, accelerometers, gyroscopes, and the like) to capture data associated with motion, acceleration, rotation, translations, tilts, and the like of the of the system. In some cases, the system may include one or more measurement units positioned in physical proximity to each of the image capture component to provide local orientation and/or position data for the corresponding image capture component.

At 806, the system may determine a motion of a head of the user based at least in part on the orientation data. For example, the user may be moving their head, walking, riding a bike or other vehicle, or the like as the user captures the first image data and the second image data. In this example, the system may determine the motion based at least in part on the orientation and position data output by the measurement units, such as the IMUs.

At 808, the system may determine a shutter delay for either the first image capture component or the second image capture component based at least in part on a skew of the first image capture component, a skew of the second image capture component, and the motion and, at 810, the system may align the first image data and the second image data by applying the shutter delay. For example, the system may determine a rotation, translation, direction, and velocity of the head of the user with respect to the target. Then based on the rotation, translation, direction, and velocity as well as the skew data for both image capture devices, determine a shutter delay (such as 1 frame, 2 frames, 3 frames, or the like) to apply to one or both of the image capture components in order to align the first image data and the second image data in the time domain.

Figure 9:
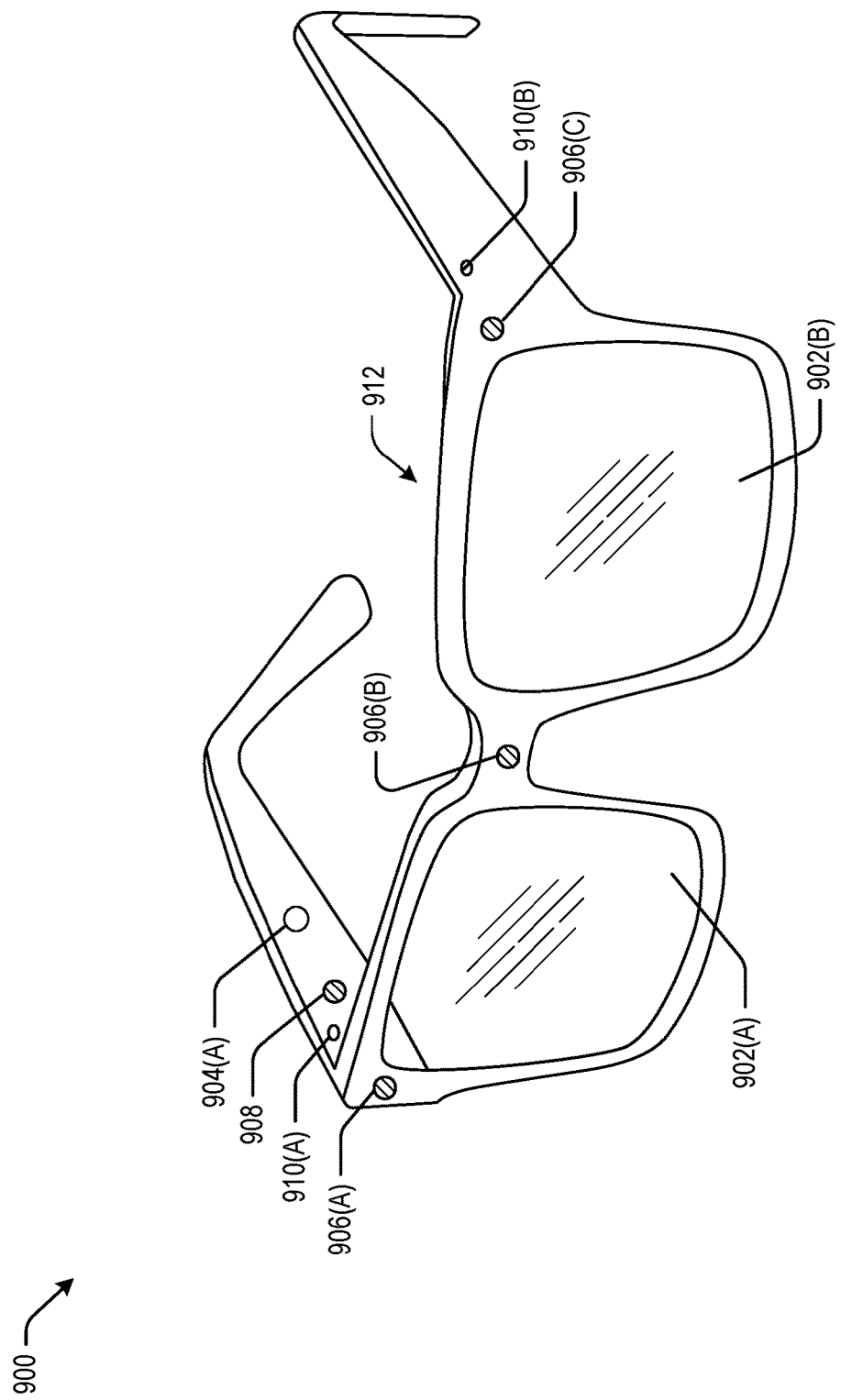
FIG. 9 is a perspective view of an example electronic device, implemented as a wearable system, in accordance with one or more examples.

FIG. 9 is a perspective view of an example electronic device 900, implemented as wearable system, in accordance with one or more examples. In some examples, the electronic device 900 is a near eye display (NED) that may be worn on the face of a user such that visual content is presented to the user using display components 902 and corresponding audio content is presented to the user using one or more microphones 904. Examples are also considered in which the electronic device 900 presents media content to a user in a different manner. Examples of content presented by the electronic device 900 may include one or more images, video, audio, tactile sensation, or some combination thereof. While FIG. 9 illustrates the components of the electronic device 900 in example locations on the electronic device 900, the components may be located elsewhere on the electronic device 900, on a peripheral device paired with the electronic device 900, or some combination thereof. Similarly, there may be more or fewer components on the electronic device 900 than what is shown in FIG. 9.

In some instances, the electronic device 900 includes a frame 912, and may include, among other components, such as a display assembly including one or more display components, one or more image capture components or assemblies 906, and/or an audio system including one or more audio components, such as the speakers 908.

The electronic device 900 may also include one or more measurement units 910, such as inertial measurement units (IMUS) to assist with tracking a pose, orientation, or position of a user as well as to provide the cropping component with orientation and motion data as discussed herein. For instance, the IMUS may assist with determining a six-degree of freedom pose of the user and/or the electronic device 900 during use. In some examples, the measurement unit(s) 910 may be configured to provide data or a signal representative of translations, rotations, and tilts associated with the frame 912.

It should be understood that the frame 912 may hold the other components of the electronic device 900. In some examples, the frame 912 may include a front portion that holds the one or more display elements, and end pieces (e.g., temples) to attach the electronic device 900 to a head of the user. In some cases, the front portion of the frame 912 bridges the top of a nose of the user. The length of the end pieces may be adjustable (e.g., adjustable temple length) to fit different users. The end pieces may also include a portion that curls behind the ear of the user (e.g., temple tip, ear-piece, etc.).

Further, while FIG. 9 illustrates the components of the electronic device 900 in example locations on the components may be elsewhere on the frame 912, on a peripheral device paired with a content delivery system, or some combination thereof. Similarly, there may be more or fewer components on the electronic device 900 than what is shown in FIG. 9.

Figure 10:
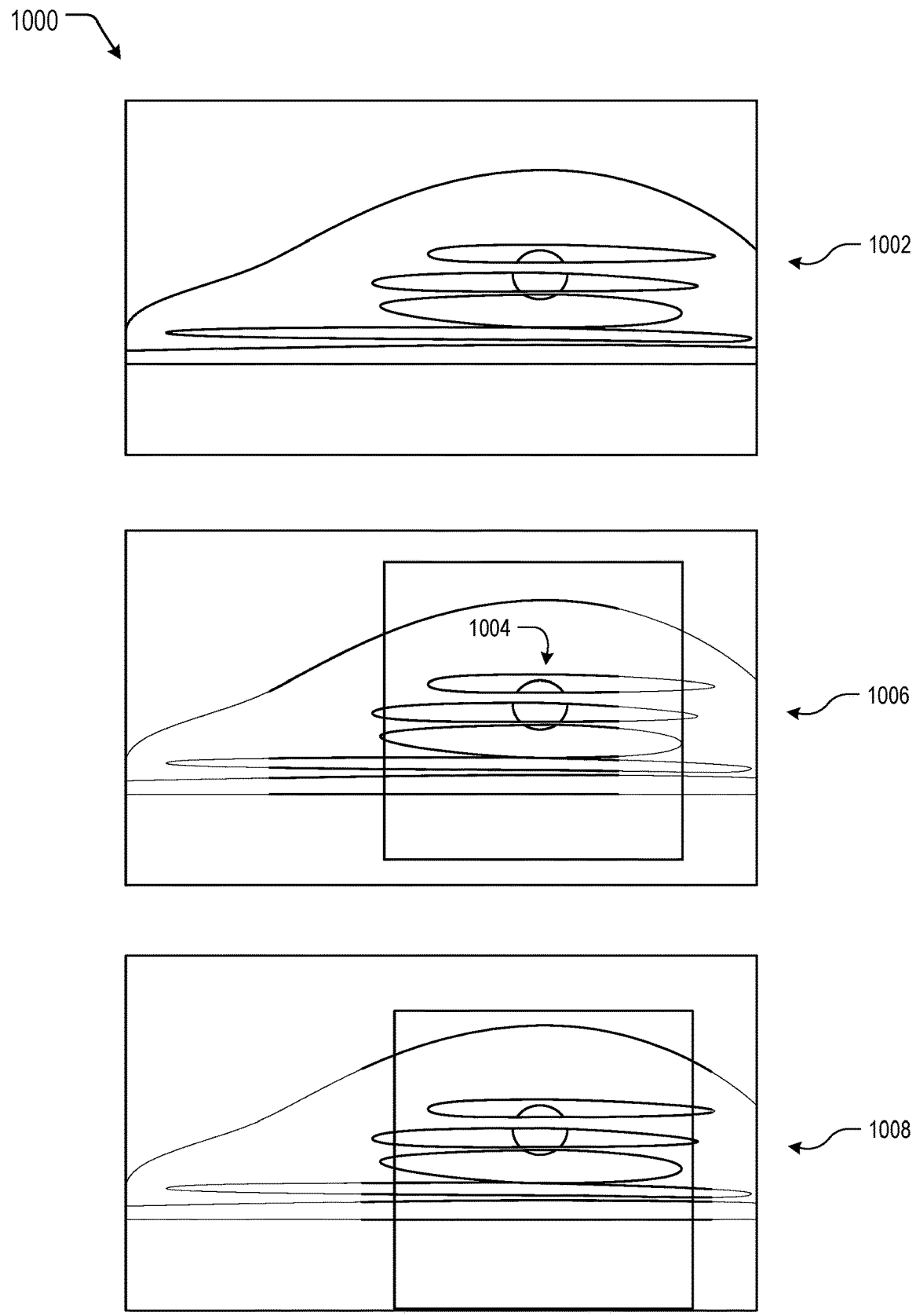
FIG. 10 is a pictorial view of an example crop or frame of the image data associated with the image capture system, in accordance with one or more examples.

FIG. 10 is a pictorial view of an example crop or frame of the image data 1000 associated with the image capture system, in accordance with one or more examples. In the current example and as discussed above, the system may be equipped with image capture components that have a larger field of view and/or resolution than the image data output by the system. The raw image data captured by the image capture component is generally illustrated as 1002.

In some cases, the system may crop or frame the image data 1000 based on a detected target 1004, such as the sun in this example. In these cases, the system may generate an output image data by cropping the image data 1000 as shown by 1006. In this manner, the target 1004 is positioned central to the output image data. The system may also adjust the cropping or framing of the image data 1000 based on the orientation and position data, as discussed above. In the illustrated example, the user may be looking slightly downwards. Accordingly, the system may adjust the position of the vertical crop or framing downwards, as illustrated by 1008, to align with the likely field of view of the user.

Figure 11:
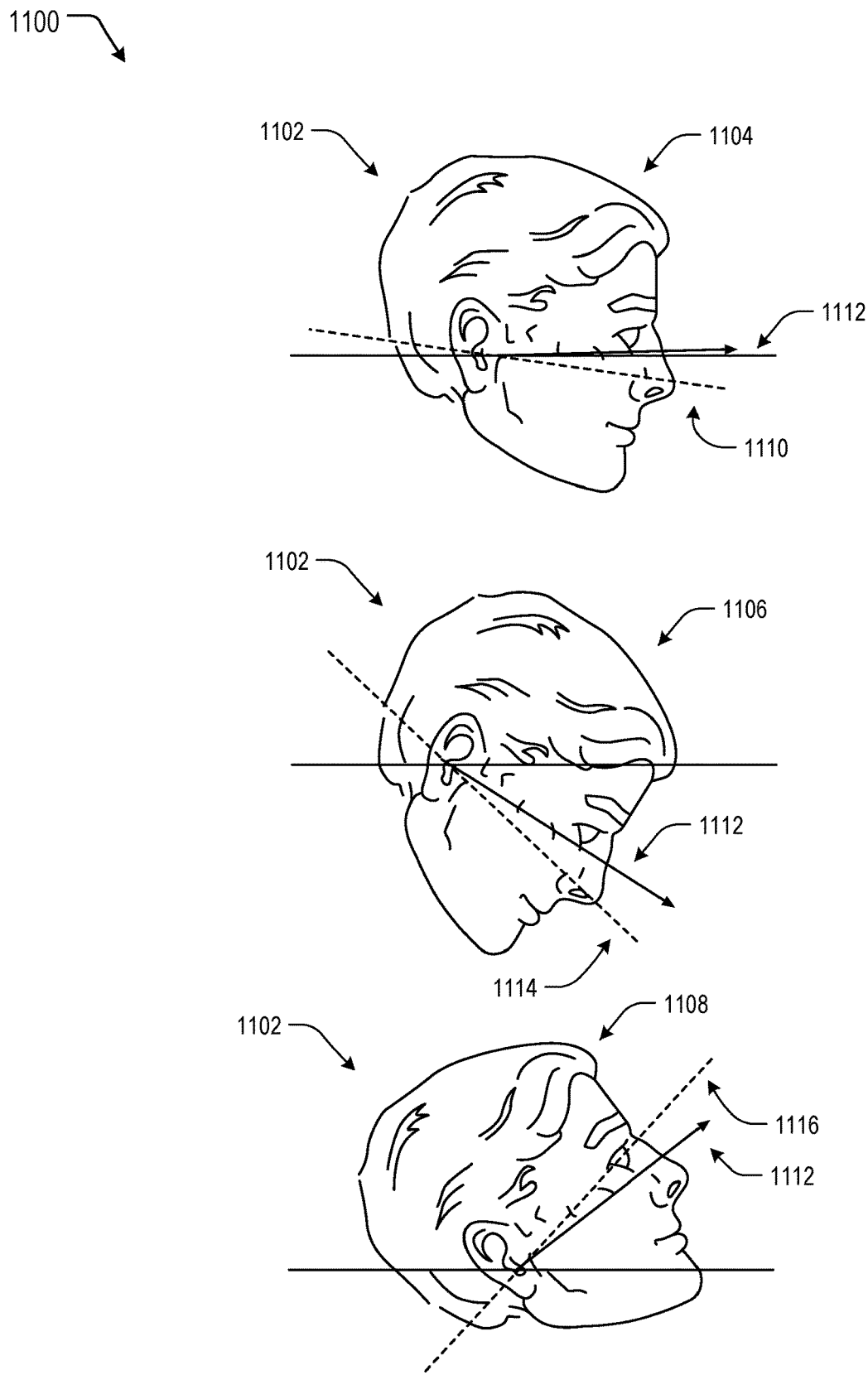
FIG. 11 is a pictorial view illustrating example field of view adjustments based on head position or pitch, in accordance with one or more examples.

FIG. 11 is a pictorial view 1100 illustrating example field of view adjustments based on head position or pitch, in accordance with one or more examples. In the current example, a head 1102 of a user is shown in various positions 1104-1108. For instance, the first position 1104 is substantially upright, the second position 1106 is pitched nose-down, and the third position 1108 is pitched nose-up. In the first position 1104 the field of view 1110 of the user is substantially aligned with the field of view 1112 of the image capture system as shown. However, in the second position 1106 the field of view 1114 of the user is lower than the field of view 1112 of the image capture system, as the user may adjust their eyes even further downward as the user pitches their head downwards. Similarly, in the third position 1108 the field of view 1116 of the user is higher than the field of view 1112 of the image capture system, as the user may adjust their eyes upward even as the user pitches their head upwards. However, in other examples, the user's gaze direction and field of view may be substantially the same as, higher than or lower than the user's head pitch. As discussed above, the system may either be initialized or trained to adjust the field of view of the image capture system based on the individual characteristics of the user or the system may apply an adjustment to the field of view based on an average user in the positions 1104-1108 shown as well as in other positions (e.g., various degrees of forward or backwards tilt, additional rotations in conjunction with pitches, and the like).

Figure 12:
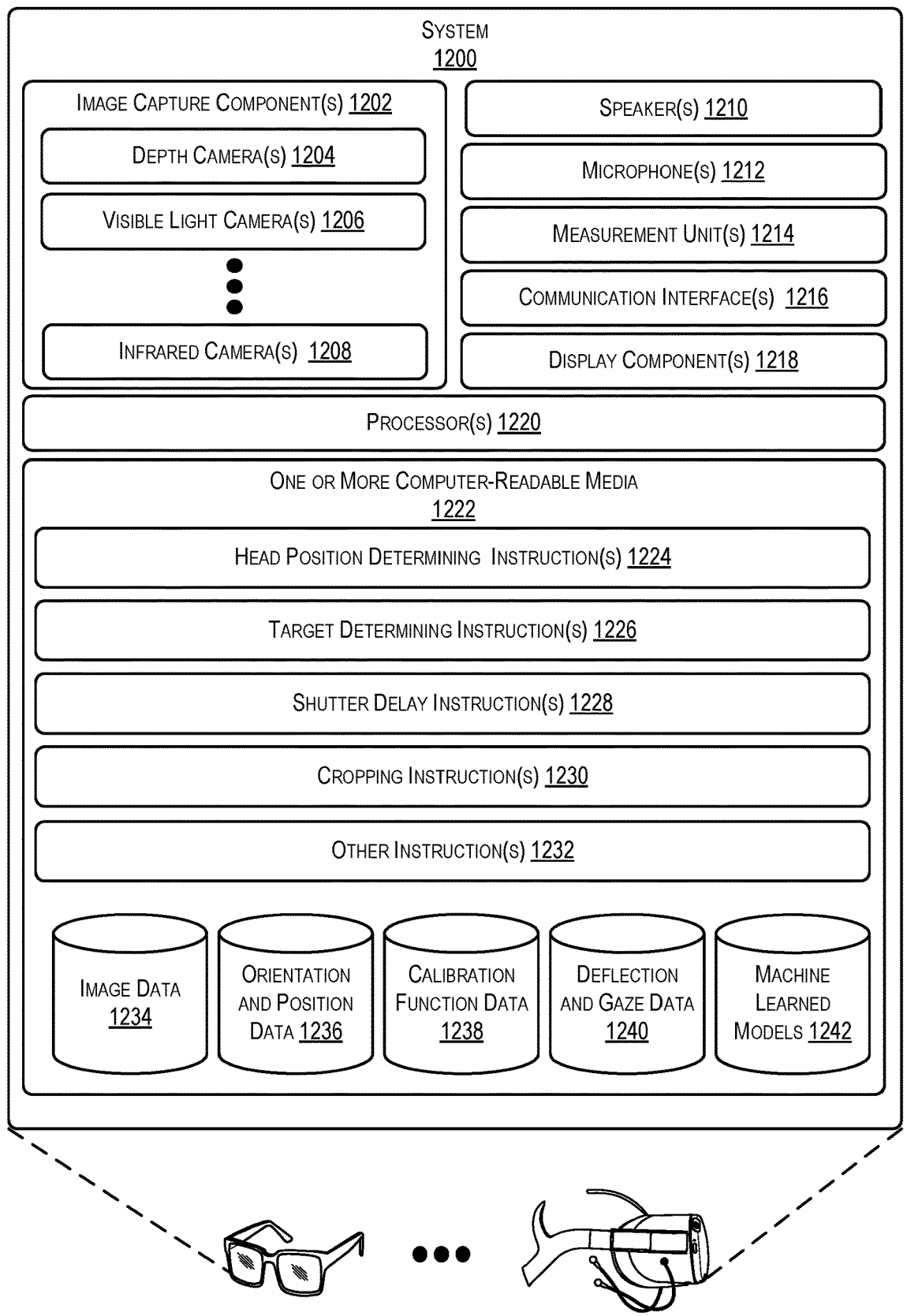
FIG. 12 is an example system implementing the wearable electronic device, in accordance with one or more examples.

FIG. 12 is an example system 1200 implementing a wearable electronic device, in accordance with one or more examples. As discussed above, the system 1200 may be configured to align image data generated by one or more image capture components 1202 to a field of view intended by the user or wearer as well as with respect to each other. As a non-limiting example, the image capture components 1202 may include one or more of a depth camera 1204, a visible light camera 1206, an infrared camera 1208, and the like to capture image data representative of a physical environment surrounding the user. In some cases, the image capture components 1202 may also include a gaze tracking system and devices usable to capture data associated with the face and eyes of the user.

In some cases, the system 1200 may be equipped with an audio system (such as to provide natural langue processing and/or voice-controlled system) that includes one or more speakers 1210, which may incorporate one or more drivers, and one or more microphones 1212. In some cases, the microphones 1212 may comprise one or more in-ear microphones, one or more directional microphones, one or more external microphones, and the like. Together the speakers 1210 and the microphones 1212 may allow the system 1200 to output sound to the user and to receive audio input data (such as spoken commands).

The system 1200 may also include one or more measurement units 1214 or other device for generating orientation and position data associated with the system 1200 and/or individual image capture components 1202, as discussed above. For example, in some cases, the measurement units 1214 may comprise one or more IMUS, accelerometers, gyroscopes, magnetometers, or a combination thereof. For instance, in one implementation, the measurement unit 1214 may comprise three accelerometers placed orthogonal to each other, three rate gyroscopes placed orthogonal to each other, three magnetometers placed orthogonal to each other, and a barometric pressure sensor to provide mechanical vibration data or signals along three axes.

The system 1200 may also include one or more communication interfaces 1216 configured to facilitate communication between one or more networks, one or more cloud-based system, and/or one or more physical objects, such as hand-held controller or complain application. The communication interfaces 1216 may also facilitate communication between one or more wireless access points, a master device, and/or one or more other computing devices as part of an ad-hoc or home network system. The communication interfaces 1216 may support both wired and wireless connection to various networks, such as cellular networks, radio, WiFi networks, short-range or near-field networks (e.g., Bluetooth®), infrared signals, local area networks, wide area networks, the Internet, and so forth. In some cases, the communication interfaces 1216 may be configured to wirelessly and communicatively couple the earbuds to the headset device.

In some examples, the system 1200 may also include one or more display components 1218 for providing or presenting visual content to a user. For example, the display components 1218 may present two-dimensional visual content or three-dimensional visual content (such as virtual reality content, mixed reality content, or augmented reality content). The display components 1218 may be reflective, emissive, or a combination of both. In some examples, the display components 1218 may include electrophoretic displays, interferometric modulator displays, cholesteric displays, backlit liquid crystal displays (LCDs), light emitting diode (LED) displays, waveguides, HOE, combiner displays, and so forth. In some cases, the display components 1218 may also include one or more lens, shutters, and the like to assist with providing a three-dimensional visual experience. In some cases, the display components 1218 may comprise two displays, such as illustrated with respect to FIG. 9 above. In these cases, each display may be tailored to provide visual content for a respective eye of the user (e.g., a left eye and right eye).

The system 1200 may also include one or more processors 1220, such as at least one or more access components, control logic circuits, central processing units, or processors, as well as one or more computer-readable media 1222 to perform the function associated with the virtual environment. Additionally, each of the processors 1220 may itself comprise one or more processors or processing cores.

Depending on the configuration, the computer-readable media 1222 may be an example of tangible non-transitory computer storage media and may include volatile and non-volatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 1220.

Several modules such as instruction, data stores, and so forth may be stored within the computer-readable media 1222 and configured to execute on the processors 1220. For example, as illustrated, the computer-readable media 1222 may store head position determining instructions 1224, target determining instructions 1226, shutter delay instructions 1228, cropping instructions 1230, as well as other instructions 1232, such as an operating system. The computer-readable media 1222 may also store data usable by the various instructions 1224-1232 and generated by the various components 1202-1220. The stored data may include image data 1234, orientation and position data 1236, calibration function data 1238, and deflection and gaze data 1240, and machine learned models 1242 or networks.

The head position determining instructions 1224 may be configured to receive the orientation and position data 1236 generated by the measurement units 1214. The head position determining instructions 1224 may then determine motion, position, and the like with respect to the head of the user to the cropping instructions 1230 in determining a field of view of the user and aligning the field of view with the output image data 1234.

The target determining instructions 1226 may be configured determine a target region and/or object within the image data 1234. For example, the target determining instructions 1226 may utilize one or more of the machine learned models 1242 to segment and classify the image data 1234 and to determine a target region or object.

The shutter delay instructions 1228 may be configured to align the image capture components 1202 within the time domain in order to generate image data 1234 of a target object or region that is substantially aligned even when the user or target is moving.

The cropping instructions 1230 may be configured to adjust the filed of view of the image data 1234 to align with the field of view of the user. For instance, the field of view may be adjusted based on the orientation and position data 1236, the calibration function data 1238, the deflection and gaze data 1240, as discussed above.

The foregoing description has been presented for illustration; it is not intended to be exhaustive or to limit the scope of the disclosure to the precise forms disclosed. Persons skilled in the relevant art can appreciate that many modifications and variations are possible considering the above disclosure.

Some portions of this description describe the examples in terms of algorithms and symbolic representations of operations on information. These algorithmic descriptions and representations may be used by those skilled in the data processing arts to convey the substance of their work effectively to others skilled in the art. These operations, while described functionally, computationally, or logically, are understood to be implemented by computer programs or equivalent electrical circuits, microcode, or the like. The described operations and their associated components may be embodied in software, firmware, hardware, or any combinations thereof.

Any of the steps, operations, or processes described herein may be performed or implemented with one or more hardware or software modules, alone or in combination with other devices. In examples, a software module is implemented with a computer program product comprising a computer-readable medium containing computer program code, which can be executed by a computer processor for performing any or all the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A system comprising:
    a first image capture component to generate first image data representative of a first field of view of a physical environment;
    a measurement unit to generate orientation and position data;
    a cropping component to:
        determine a tilt of a head of a user of the system based at least in part on the orientation and position data;
        determine an expected eye tilt based at least in part on the tilt of the head;
        determine a calibration transfer function from a plurality of calibration transfer functions based at least in part on the orientation and position data and the expected eye tilt; and
        generate second image data based at least in part on the orientation and position data and the calibration transfer function, the second image data being representative of a second field of view which is a subset of the first field of view; and
    a communication interface for sending the second image data to a remote device.

2. The system of claim 1, wherein the system comprises a head-mounted device and the cropping component is further configured to:
    determine a tilt of the head-mounted device based at least in part on the orientation and position data; and
    select the calibration transfer function from the plurality of calibration transfer functions further based at least in part on the tilt of the head-mounted device.

3. The system of claim 1, further comprising:
    a gaze detection component to generate gaze data associated with the expected eye tilt; and
    wherein determining the calibration transfer function further comprises selecting the calibration transfer function from the plurality of calibration transfer functions based at least in part on the gaze data.

4. The system of claim 1, further comprising:
a second image capture component to generate third image data representative of the physical environment;
a shutter control component to determine a first shutter delay associated with the first image capture component and a second shutter delay associated with the second image capture component based at least in part on the first image data and the third image data; and
wherein the cropping component generates the second image data based at least in part on the third image data.

5. The system of claim 1, wherein the cropping component is further configured to:
determine a target based at least in part on the first image data; and
wherein the generating second image data comprises determining the second field of view associated with the target and cropping the first image data based on the second field of view.

6. A method comprising:
receiving first image data representative of a physical environment;
receiving orientation and position data associated with a wearable electronic device;
determining a tilt of a head of a user of the wearable electronic device based at least in part on the orientation and position data;
determining an expected eye tilt based at least in part on the tilt of the head;
determining a calibration transfer function from a plurality of calibration transfer functions based at least in part on the orientation and position data and the expected eye tilt;
determining a field of view of a user of the wearable electronic device based at least in part on the first image data, the orientation and position data, and the calibration transfer function;
cropping, based at least in part on the field of view, the first image data to generate second image data; and
storing the second image data locally or sending to a remote device.

7. The method of claim 6, further comprising:
determining a position of the wearable electronic device based at least in part on the orientation and position data; and
wherein determining the calibration transfer function further comprises selecting the calibration transfer function from a plurality of calibration transfer functions based at least in part on the position of the wearable electronic device and the expected eye tilt.

8. The method of claim 6, further comprising:
receiving gaze data associated with an eye of the user; and
wherein determining the calibration transfer function further comprises selecting the calibration transfer function from a plurality of calibration transfer functions based at least in part on the gaze data.

9. The method of claim 6, wherein the first image data is stereo image data and includes third image data from a first image capture component and fourth image data from a second image capture component and the method further comprising:
determining a shutter delay associated with the first image capture component relative to the second image capture component based at least in part on the third image data and the fourth image data.

10. The method of claim 6, further comprising:
receiving, in response to inputting the first image data into one or more machine learned models or networks, a target associated with the first image data; and
wherein the generating second image data is based at least in part on the target.

11. The method of claim 6, wherein the second image data represents a smaller field of view than the first image data.

12. The method of claim 6, wherein the wearable electronic device comprises glasses.

13. The method of claim 6, further comprising:
determining an initialization of the wearable electronic device;
capturing third image data associated with the user and the wearable electronic device;
determining a deformation of the wearable electronic device based at least in part on the third image data; and
wherein determining the calibration transfer function is based at least in part on the deformation of the wearable electronic device.

14. One or more non-transitory computer-readable media storing instructions that, when executed by one or more processors, cause the one or more processors to perform operations comprising:
receiving first image data representative of a physical environment;
receiving orientation and position data associated with a wearable electronic device;
determining a tilt of a head of a user of the wearable electronic device based at least in part on the orientation and position data;
determining an expected eye tilt based at least in part on the tilt of the head;
determining a calibration transfer function from a plurality of calibration transfer functions based at least in part on the orientation and position data and the expected eye tilt;
determining a field of view of a user of the wearable electronic device based at least in part on the first image data, the orientation and position data, and the calibration transfer function;
cropping, based at least in part on the field of view, the first image data to generate second image data; and
storing the second image data locally or sending to a remote device.

15. The one or more non-transitory computer-readable media of claim 14, wherein the operations comprise:
determining a position of the wearable electronic device based at least in part on the orientation and position data; and
wherein determining the calibration transfer function further comprises selecting the calibration transfer function from the plurality of calibration transfer functions further based at least in part on the position of the wearable electronic device and the expected eye tilt.

16. The one or more non-transitory computer-readable media of claim 14, wherein the operations comprise:
receiving gaze data associated with an eye of the user; and
wherein determining the calibration transfer function further comprises selecting the calibration transfer function from a plurality of calibration transfer functions based at least in part on the gaze data.

17. The one or more non-transitory computer-readable media of claim 14, wherein the first image data is stereo image data and includes third image data from a first image capture component and fourth image data from a second image capture component and the operations further comprising:
  determining a shutter delay associated with the first image capture component relative to the second image capture component based at least in part on the third image data and the fourth image data.

18. The one or more non-transitory computer-readable media of claim 14, wherein the operations comprise:
  receiving, in response to inputting the first image data into one or more machine learned models or networks, a target associated with the first image data; and
  wherein the generating second image data is based at least in part on the target.

19. The one or more non-transitory computer-readable media of claim 14, wherein the operations comprise:
  determining an initialization of the wearable electronic device;
  capturing third image data associated with the user and the wearable electronic device;
  determining the expected eye position of the user at one or more head positions based at least in part on the third image data; and
  wherein determining the calibration transfer function is based on the expected eye position of the user at the one or more head positions.

20. The system of claim 1, wherein generating the second image data is based at least in part on a target object identified within the first image data.

\* \* \* \* \*